United States Patent
Rispler

(10) Patent No.: US 7,231,797 B2
(45) Date of Patent: Jun. 19, 2007

(54) CALKING DIE AND CALKED HEEL

(75) Inventor: Florian Rispler, Hirschegg (AT)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 10/129,928

(22) PCT Filed: Aug. 25, 2001

(86) PCT No.: PCT/DE01/03261

§ 371 (c)(1),
(2), (4) Date: Aug. 9, 2002

(87) PCT Pub. No.: WO02/22290

PCT Pub. Date: Mar. 21, 2002

(65) Prior Publication Data

US 2003/0029219 A1    Feb. 13, 2003

(30) Foreign Application Priority Data

Sep. 12, 2000    (DE) .............................. 100 44 897

(51) Int. Cl.
*B21K 1/20* (2006.01)
*B23P 11/00* (2006.01)

(52) U.S. Cl. ........................ 72/325; 29/509; 29/520; 29/890.13; 251/129.15

(58) Field of Classification Search .............. 72/325; 29/520, 515, 509, 566, 890.13; 137/15.17; 251/129.15, 359

See application file for complete search history.

(56) References Cited

U.S. PATENT DOCUMENTS

| | | | | |
|---|---|---|---|---|
| 1,959,068 A * | 5/1934 | Stoll | ........................ | 228/265 |
| 3,191,268 A * | 6/1965 | Matea | ........................ | 438/124 |
| 3,699,637 A * | 10/1972 | Rosiek | ........................ | 29/432.1 |
| 4,509,722 A * | 4/1985 | Ebihara | ........................ | 251/359 |
| 4,805,280 A * | 2/1989 | Elander et al. | ........... | 29/898.07 |
| 5,333,836 A * | 8/1994 | Fukuyo et al. | ......... | 251/129.15 |
| 5,626,326 A * | 5/1997 | Goossens et al. | ...... | 251/129.15 |
| 5,931,179 A * | 8/1999 | Megerle et al. | .......... | 137/15.17 |
| 5,984,263 A * | 11/1999 | Hosoya | .................. | 251/129.15 |
| 6,529,106 B1 * | 3/2003 | Linhoff et al. | .............. | 335/220 |
| 6,644,623 B1 * | 11/2003 | Voss et al. | ............. | 251/129.15 |
| 6,805,157 B2 * | 10/2004 | Nakazawa et al. | .......... | 137/540 |
| 6,851,659 B2 * | 2/2005 | Zutt et al. | .................... | 251/359 |

FOREIGN PATENT DOCUMENTS

WO    WO 01/00473 A1 *    1/2001

* cited by examiner

*Primary Examiner*—Daniel C. Crane
(74) *Attorney, Agent, or Firm*—Ronald E. Greigg

(57) ABSTRACT

A calking die for calking a component in a receiving bore, in particular for calking a securing flange in a stepped receiving bore of a valve block of a traction-controlled vehicle brake system, having an end face oriented toward the component, which face can be brought at least partially into engagement with a calked volume disposed on an edge of the receiving bore, in order to positively displace at least some of the calked volume in the form of a calked bead from the bore edge toward a face of the component. The end face of the calking die has a peripheral recess, which extends from a diameter defining a radially inner remaining end face to a radially outer circumferential face of the calking die and which is intended for at least partially receiving the calked bead.

7 Claims, 3 Drawing Sheets

CALKING DIE AND CALKED HEEL

CROSS-REFERENCE TO RELATED APPLICATIONS

This is a 35 USC 371 application of PCT/DE 01/03261 filed on Aug. 28, 2001.

BACKGROUND OF THE INVENTION

1. Field of the Invention

The invention is based on a calking die for calking a component in a receiving bore, in particular for calking a securing flange in a stepped receiving bore of a valve block of a traction-controlled vehicle brake system and on a calked heel for securing the flange in the bore.

2. Description of the Prior Art

From German Patent Disclosure DE 43 32 538 A1, a hydraulic unit for a traction-controlled motor vehicle brake system is known, having a valve block with a stepped receiving bore for the hydraulic part of an electromagnetically actuated valve. The hydraulic part includes a bush with a securing flange, which is axially fixed by means of a calked heel against a step of the receiving bore. To make the calked heel, a sleevelike centering die is slipped over the bush to be calked. A likewise sleevelike calking die is guided axially movably on the outer circumference of the centering die; it has a larger diameter than the receiving bore. By exerting an axially acting calking force on the calking die, a calked volume on the upper edge of the receiving bore is positively displaced as a calked bead over onto the securing flange of the bush. The resultant plastic deformation of material in the region of the calked bead secures the position of the bush in the valve block and diverts the forces, which have been transmitted to the securing flange of the bush, into the valve block; in such a case, the term "retaining calked heel" is therefore also used. So-called "sealing calked heels" are also known, which by way of example seal the hydraulic part, which is subjected to pressure fluid, of the electromagnetically actuated valve off from the environment in a fluid- and pressure-tight manner.

However, joining plays and component tolerances often lead to an eccentric position of the centering die relative to the axis of the receiving bore, so that the calking die is stamped out with a variable thickness in the circumferential direction, and if the eccentricity is great enough, peripheral portions with extremely thin calked beads can be the result. In the case of retaining calked heels, this reduces the durability, while with sealing calked heels, it impairs the sealing function.

In known sealing calked heels, additional sealing elements such as O-rings are often also used to assure an adequate sealing action, since at major calking forces the calked bead has the tendency to flow away radially inward, and consequently adequately high compressive strains cannot build up between the calked volume and the component to be calked. In assembly or in the calking operation, however, there is the risk that these sealing elements will be damaged.

SUMMARY OF THE INVENTION

The calking die of the invention has the advantage over the prior art that because of the peripheral recess in the end face, a boundary, particularly a radial boundary, for the calked volume positively displaced from the upper edge of the receiving bore is formed. This volume is then incapable of escaping the axial pressure by flowing radially inward. Consequently, high radial compressive strains can build up between the component to be calked and the calked bead. The calked heel produced with the calking die of the invention is therefore distinguished by high tightness and great durability. It is therefore possible to dispense with additional sealing elements.

In an especially preferred provision, the cross section of the peripheral recess widens, preferably in a graduated conical way, in the axial direction pointing away from the component. The contour of the peripheral recess is formed preferably by three plane faces, which adjoin one another, beginning at the diameter $D_0$, in an ever-increasing obliquity relative to an axis of the receiving bore. Because of the widened cross section, the peripheral recess brings about self-centering of the calking die, when this die is guided under axial pressure against the edge of the receiving bore. Then the calking die is embodied as uniformly thick in the circumferential direction, with an advantageous effect on the tightness and strength of the calked connection. Furthermore, because of the self-centering properties of the calking die, it is possible to dispense with the centering die.

The remaining end face is embodied as a plane, annular face, extending perpendicular to the axis of the receiving bore, which face is defined radially outward by the radially inner edge of the peripheral recess at the diameter $D_0$ and radially inward by the inner diameter $D_i$ of the calking die. Expediently, there should be sufficient wall thickness between the inner diameter $D_i$ of the calking die and the radial inner edge of the peripheral recess to be able to withstand the pressure forces exerted by the calked bead as it is being positively displaced radially inward.

Expediently, the calking die is adapted to the geometry of the receiving bore in such a way that the diameter $D_0$ defining the remaining end face, on the radially inner edge of the peripheral recess, is less than the diameter d of the receiving bore, and the radially outer diameter $D_a$ of the calking die extends as far as a radially outer edge of the calked volume.

BRIEF DESCRIPTION OF THE DRAWINGS

One exemplary embodiment of the invention is described in further detail in the ensuing description, taken with the drawings, in which.

DESCRIPTION OF THE PREFERRED EMBODIMENT

Figure 1:
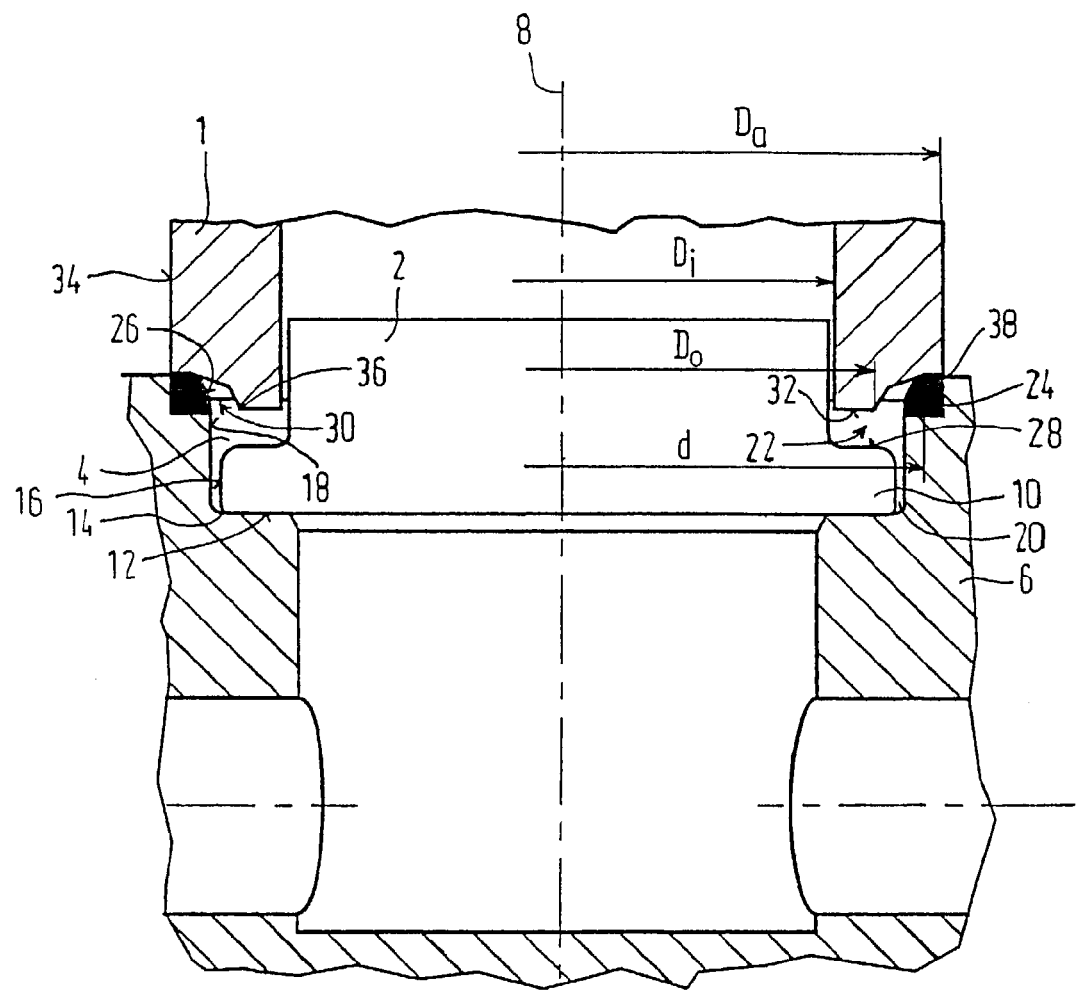
FIG. 1, a cross-sectional view of a preferred embodiment of a calking die of the invention, in an initial phase of the calking operation.

The cross-sectional view of FIG. 1, for reasons of scale, shows only a face-end region of a calking die 1, the region that comes into engagement with a workpiece. In the preferred embodiment, the calking die 1 serves to calk a bush 2 in a stepped receiving bore 4 of a valve block 6 of a traction-controlled vehicle brake system. By way of example, the calking die 1 is embodied in sleevelike fashion and is coaxial with an axis 8 of the receiving bore 4. The bush 2 is provided with a securing flange 10, which with a radially outer part of its end face 12, extending at a right angle to the axis 8 of the receiving bore 4 and remote from the calking die 1, rests on a bore step 14. Between a radially outer circumferential face 16 of the securing flange 10 and a radially inner circumferential face 18 of the receiving bore 4, a narrow annular gap 20 allowing a slight joining play exists before the calking is done.

FIG. 1 shows the situation immediately before the calking, when an end face 22 of the calking die 1, which is movable under axial pressure in the direction of the axis 8 of the receiving bore 4, comes into engagement with an edge 24, emphasized in the drawing by being blackened, of the receiving bore 4. The bore edge 24 is provided with a chamfer 26, for instance, and forms the calked volume, or in other words the region which is positively displaced radially inward by the axial pressure of the calking die 1 and which, after the completion of the calking operation, will as a calked bead at least partly cover the other end face 28 of the securing flange 10, which end face also extends at a right angle to the axis 8 of the receiving bore 4.

According to the invention, the end face 22 of the calking die 1 has a peripheral recess 30, which is adapted to the particular geometric conditions of the receiving bore 4 and preferably extends from a diameter $D_0$, defining a radially inner remaining end face 32, as far as a radially outer circumferential face 34 on the outer diameter $D_a$ of the calking die 1. The remaining end face 32 is plane, for example; it extends at a right angle to the axis 8 of the receiving bore 4 and is defined on the inside by the inside diameter $D_i$ of the calking die 1. The diameter $D_0$ defining the remaining end face 32 on the radially inner edge 36 of the peripheral recess 30 is smaller than the diameter d of the receiving bore 4 in the region of the outer edge of the chamfer 26, and the radially outer diameter $D_a$ of the calking die 1 extends essentially as far as a radially outer edge 38 of the calked volume 24, so that the peripheral recess 30 is axially opposite the calked volume 24 and receives it completely, in the radial direction, while in the axial direction it receives it at least partly inside itself.

Figure 2:
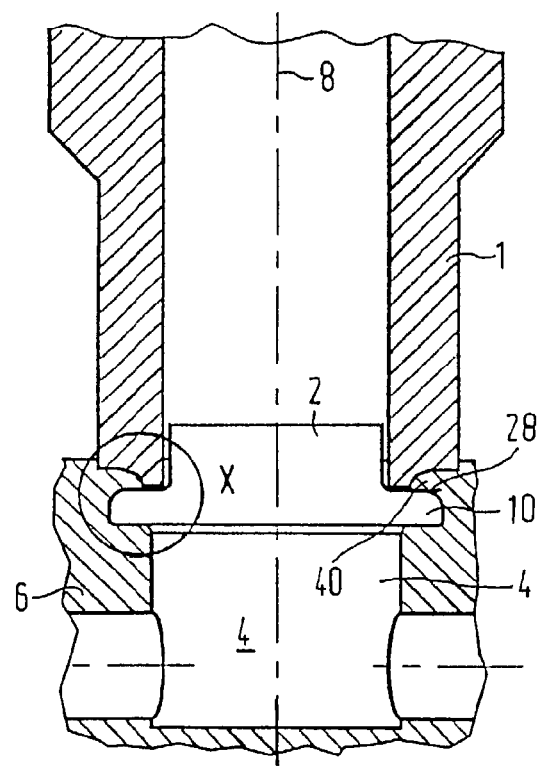
FIG. 2, the calking die of FIG. 1 in a final phase of the calking operation.

The situation in a final phase of the calking operation is shown in FIG. 2, where some of the calked volume 24 has been positively displaced, in the form of a calked bead 40, over the other end face 28 of the securing flange 10, extending perpendicular to the axis 8 of the receiving bore 4, and secures the location of this flange in the receiving bore. As best seen from the detail X of FIG. 2 shown enlarged in FIG. 3, the calked bead 40 is essentially entirely enclosed by the surface of the peripheral recess 30 of the calking die 1; in particular, it is bounded by the radially inner edge 36 of the peripheral recess 30 at the diameter $D_0$, so that it cannot flow away radially inward. A residual gap 42 remaining between the end face 28 of the securing flange 10 and the remaining end face 32 of the calking die 1 is too narrow for the calked bead 40 to be capable of flowing into it. The annular gap 20 (see FIG. 1) that exists before the calking operation between the radially outer circumferential face 16 of the securing flange 10 and the radially inner circumferential face 18 of the receiving bore 4 is, after the calking, completely filled with the remaining portion of the calked volume 24, so that the bush 2 seals off the receiving bore 4 from the environment in fluid- and pressure-tight fashion.

Figure 3:
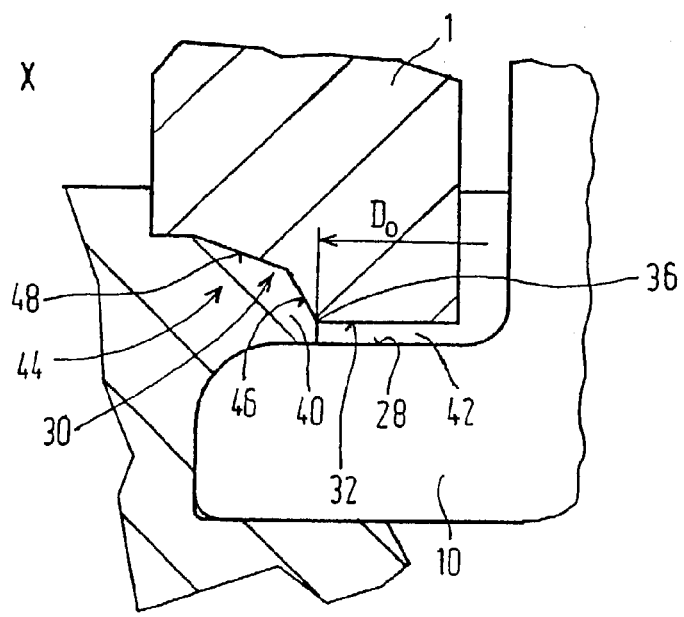
FIG. 3, the detail marked X of FIG. 2, enlarged.

As also best shown by FIG. 3, the cross section of the peripheral recess 30 widens gradually, preferably in a stepped conical fashion, in the axial direction pointing away from the component. Beginning at the radially inner edge 36 of the peripheral recess 30, the contour of the peripheral recess is formed for instance by three plane faces 44, which beginning at the diameter $D_0$ adjoin one another in ever-increasing obliquity or an increasing angle relative to the axis 8 of the receiving bore 4.

Figure 4:
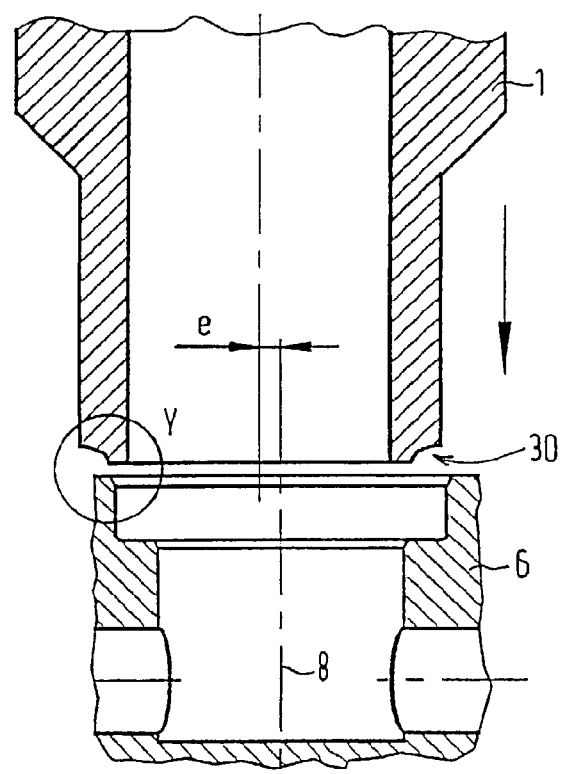
FIG. 4, a cross-sectional view of a calking die, eccentrically offset relative to an axis of the receiving bore, in an initial phase of the calking operation.
Figure 5:
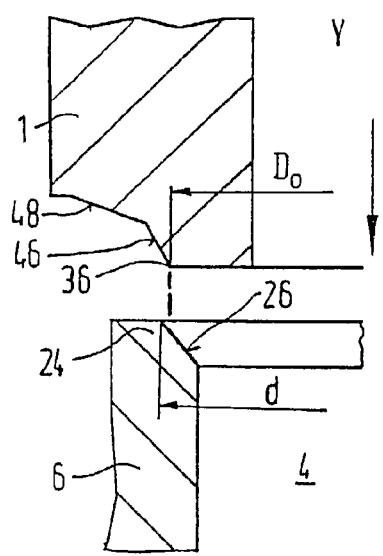
FIG. 5, the detail Y of FIG. 4, enlarged.
Figure 6:
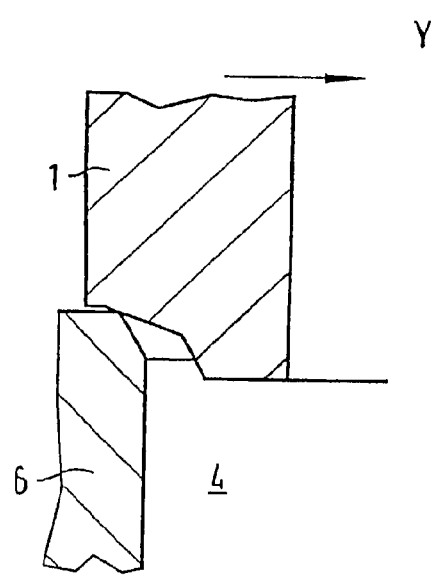
FIG. 6, the detail Y in a final phase of the calking operation.

The effect of the widening cross-sectional profile of the peripheral recess 30 is shown in FIGS. 4–6, where the situation of a calking die 1 is shown that while it is parallel, nevertheless it is offset, for instance to the left, from the axis 8 of the receiving bore 4 by an eccentricity e. For the sake of simplicity, the bush 2 to be calked is not shown here. As the enlarged detail Y of FIG. 5 shows, it is assumed that the inner edge 36 of the peripheral recess 30, which edge is identified by the diameter $D_0$, is still, despite the eccentricity e, located inside an imaginary cylinder having the diameter d of the outer edge of the chamfer 26 of the receiving bore 4. If the calking die 1 is then moved as in FIG. 5 in the direction of the arrow toward the receiving bore 4, then first a first beveled face 46, in a left-hand circumferential region of the peripheral recess 30, comes to rest on the chamfer 26 beveled in the same direction on the bore edge 24. Because of the beveled cross-sectional course of the peripheral recess 30 in the region of the first face 46, the calking die 1 is simultaneously moved some distance to the right during its axial motion, being forced toward the central position, as indicated by the arrow in FIG. 6. The same is true when a second beveled face 48 then rests on the bore edge 24, so that during the calking operation, because of the axial advancement, the calking die can center itself on the bore edge 24. As a consequence, the calked bead finally formed has a uniform thickness circumferentially. Instead of being stepped, the cross section of the peripheral recess 30 can be widened in any conceivable way, for instance being smoothly conical or rounded.

The foregoing relates to preferred exemplary embodiments of the invention, it being understood that other variants and embodiments thereof are possible within the spirit and scope of the invention, the latter being defined by the appended claims.

I claim:

1. A calking die (1) for calking a securing flange (10) in a stepped receiving bore (4) of a valve block (6) of a traction-controlled vehicle brake system, comprising an end face (22) oriented toward the securing flange (10), which face can be brought at least partially into engagement with a calked volume (24) disposed on an edge of the receiving bore (4), in order to positively displace at least some of the calked volume (24) in the form of a calked bead (40) from the bore edge toward a face (28) of the securing flange (10), a peripheral recess in the end face (22) of the calking die (1), the peripheral recess (30) extending from a diameter ($D_0$) defining a radially inner remaining end face (32) to a radially outer circumferential face (34) of the calking die (1) and which is intended for at least partially receiving the calked bead (40).

2. The calking die of claim 1, wherein the cross section of the peripheral recess (30) widens in the axial direction pointing away from the securing flange.

3. The calking die of claim 2, wherein the contour of the peripheral recess (30) is formed by three plane faces (44), which adjoin one another, beginning at the diameter ($D_0$), in an ever-increasing obliquity relative to an axis (8) of the receiving bore (4).

4. The calking die of claim 3, wherein the remaining end face (32) is embodied as a plane, annular face, extending perpendicular to the axis (8) of the receiving bore (4), which annular face is defined radially outward by the radially inner edge (36) of the peripheral recess (30) at the diameter ($D_0$) and radially inward by the inner diameter ($D_1$) of the calking die (1).

5. The calking die of claim 4, wherein the die is adapted to the receiving bore (4) in such a way that the diameter ($D_0$) defining the remaining end face (32), on the radially inner edge (36) of the peripheral recess (30), is less than the diameter (d) of the receiving bore (4), and the radially outer diameter ($D_a$) of the calking die (1) extends as far as a radially outer edge of the calked volume (24).

6. A calked bead securing a flange (10) of a component (2) in a stepped receiving bore (4) of a valve block (6) of a traction-controlled vehicle brake system, wherein the cross section of the calked bead gradually widens in the axial direction pointing away from the securing flange and wherein the calked bead has an integrally formed-on inner end nearest an axis of the receiving bore (4), and wherein said inner end defines an opening having a diameter ($D_0$) and wherein the contour of the calked bead is formed by three plane faces, which adjoin one another, beginning at the diameter ($D_0$), in an ever-increasing obliquity relative to the axis of the receiving bore (4).

7. A calked bead securing a flange (10) of a component (2) in a stepped receiving bore (4) of a valve block (6) of a traction-controlled vehicle brake system, said calked bead being formed by a calking die comprising an end face (22) oriented toward the securing flange (10), which face can be brought at least partially into engagement with a calked volume (24) disposed on an edge of the receiving bore (4), in order to positively displace at least some of the calked volume (24) in the form of the calked bead from a bore edge toward a face (28) of the securing flange (10), said calking die having a peripheral recess in the end face (22) of the calking die (1), the peripheral recess (30) extending from a diameter ($D_0$) defining a radially inner remaining end face (32) to a radially outer circumferential face (34) of the calking die (1) and which is intended for at least partially receiving the calked bead, wherein the cross section of the calked bead gradually widens in the axial direction pointing away from the securing flange, wherein the calked bead has an integrally formed-on inner end nearest an axis of the receiving bore (4) having a diameter ($D_0$) corresponding to the diameter ($D_0$) defining the radially inner remaining end face (32) of the calking die, said flange having a surface (28) in contact with said calked bead, and wherein said calked bead is formed to cover less than the entire area of said surface (28).

* * * * *